United States Patent
Kim et al.

(10) Patent No.: US 9,403,940 B2
(45) Date of Patent: Aug. 2, 2016

(54) POLYALKYLENECARBONATE RESIN AND METHOD FOR PREPARING THE SAME

(71) Applicant: LG CHEM, LTD., Seoul (KR)

(72) Inventors: Yoon Jung Kim, Daejeon (KR); Bo Hyun Seong, Daejeon (KR); Taek Jun Jung, Daejeon (KR); Yun Ki Cho, Daejeon (KR); Seung Young Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/437,412

(22) PCT Filed: Sep. 5, 2014

(86) PCT No.: PCT/KR2014/008423
§ 371 (c)(1),
(2) Date: Apr. 21, 2015

(87) PCT Pub. No.: WO2015/034328
PCT Pub. Date: Mar. 12, 2015

(65) Prior Publication Data
US 2015/0259474 A1    Sep. 17, 2015

(30) Foreign Application Priority Data

Sep. 9, 2013 (KR) .................. 10-2013-0108094
Sep. 5, 2014 (KR) .................. 10-2014-0119029

(51) Int. Cl.
| | | |
|---|---|---|
| *D02G 3/00* | (2006.01) | |
| *C08G 64/34* | (2006.01) | |
| *C08G 64/38* | (2006.01) | |
| *C08G 64/40* | (2006.01) | |
| *C08G 64/02* | (2006.01) | |
| *B32B 5/16* | (2006.01) | |

(52) U.S. Cl.
CPC ............ *C08G 64/34* (2013.01); *C08G 64/0291* (2013.01); *C08G 64/38* (2013.01); *C08G 64/40* (2013.01)

(58) Field of Classification Search
CPC ...................................................... C09J 179/04
USPC ............................ 528/211; 428/413, 414, 361
See application file for complete search history.

(56) References Cited

U.S. PATENT DOCUMENTS

2013/0172482 A1    7/2013    Allen et al.

FOREIGN PATENT DOCUMENTS

| CN | 1775828 A | 5/2006 |
|---|---|---|
| CN | 101824153 | * 9/2010 |
| CN | 102731766 A | 10/2012 |
| JP | 49-81498 | 8/1974 |
| JP | 03-195729 A | 8/1991 |
| JP | 6-73173 A | 3/1994 |
| JP | 2781104 B2 | 7/1998 |
| JP | 2007-302731 A | 11/2007 |
| JP | 2008-523181 A | 7/2008 |
| JP | 2008-280399 A | 11/2008 |
| JP | 2010-516796 A | 5/2010 |
| JP | 2010-287563 A | 12/2010 |
| JP | 2012-236783 A | 12/2012 |
| JP | 2014-9282 A | 1/2014 |
| JP | 2014-51456 A | 3/2014 |
| KR | 10-1999-0048127 A | 7/1999 |
| KR | 10-0239222 B1 | 10/1999 |
| KR | 10-2004-0011381 A | 5/2004 |
| KR | 10-0699134 B1 | 3/2007 |
| KR | 10-2011-0114232 A | 10/2010 |
| KR | 10-2012-0026422 A | 3/2012 |
| KR | 10-2012-0034813 A | 4/2012 |
| KR | 10-2013-0044223 A | 5/2013 |
| KR | 10-2013-0124199 A | 11/2013 |
| WO | 2012-027725 A1 | 3/2012 |
| WO | 2014-037715 A1 | 3/2014 |

OTHER PUBLICATIONS

J. Li, M. F. Lai and J. J. Liu ,Control and development of crystallinity and morphology in poly(β-hydroxybutyrate-co-β-hydroxyvalerate) /poly(propylene carbonate) blends; Article first published online: Aug. 17, 2005, www.interscience.wiley.com.*

Takehisa Matsuda et al., Photocurable Biodegradable Liquid Copolymers: Synthesis of Acrylate-End-Capped Trimethylene Carbonate-Based Prepolymers, Photocuring, and Hydrolysis, Division of Biomedical Engineering, Graduate School of Medicine, Kyushu University, 3-1-1 Maidashi, Higashi-ku, Fukuoka 812-8582, Japan Biomacromolecules, 2004, 5 (2), pp. 29.*

Ren-Jian Wei, et al.,Functional poly(carbonate-co-ether) synthesisfrom glycidyl methacrylate/CO2 copolymerization catalyzed by Zn—Co(III) double metal cyanide complex catalyst, FanRSC Adv., 2014, 4, 3188.*

* cited by examiner

*Primary Examiner* — Terressa Boykin
(74) *Attorney, Agent, or Firm* — Dentons US LLP

(57) ABSTRACT

This disclosure relates to polyalkylene carbonate resin that inhibits decomposition of resin resulting from back-biting and the like when heat treated, and thus exhibits improved thermal stability, and a method for preparing the same. The polyalkylene carbonate resin may comprise a basic polyalkylene carbonate based repeat unit, a polyalkyleneglycol based repeat unit, and the polyalkylene carbonate repeat unit crosslinked by a specific compound.

17 Claims, No Drawings

POLYALKYLENECARBONATE RESIN AND METHOD FOR PREPARING THE SAME

This application is a National Stage Entry of International Application No. PCT/KR2014/008423, filed Sep. 5, 2014, and claims the benefit of Korean Application No. 10-2013-0108094 filed on Sep. 9, 2013, and Korean Application No. 10-2014-0119029 filed on Sep. 5, 2014 all of which are hereby incorporated by reference in their entirety for all purposes as if fully set forth herein.

TECHNICAL FIELD

The present invention relates to polyalkylene carbonate resin that can inhibit decomposition of resin resulting from back-biting when thermally cured or heated, and thus exhibit improved thermal stability, and a method for preparing the same.

BACKGROUND

Polyalkylene carbonate resin is polymer material useful for packaging material or coating material and the like. A method of preparing polyalkylene carbonate resin from an epoxy compound and carbon dioxide is eco-friendly in that noxious compound phosgene is not used and that carbon dioxide can be obtained in the air. Thus, many researchers have been developed various forms of catalysts in order to prepare polyalkylene carbonate resin from an epoxy compound and carbon dioxide.

However, the polyalkylene carbonate resin basically exhibits biodegradability and is often vulnerable to heat. Particularly, if the polyalkylene resin is thermally cured for application for a product, or the resin product is exposed to heat, a polymer main chain of polyalkylene carbonate generally having a linear structure may be decomposed by back-biting and the like. Thereby, molecular weight or mechanical properties of the polyalkylene carbonate resin may be degraded, which may act as a hindrance to application of polyalkylene carbonate resin for more various uses. Although various efforts have been made to improve inferior thermal stability of the polyalkylene carbonate resin, polyalkylene carbonate resin with excellent thermal stability has not been developed yet.

DISCLOSURE

Technical Problem

It is an object of the invention to provide polyalkylene carbonate resin that inhibits decomposition of resin resulting from back-biting and the like when thermally cured or heated, and thus exhibits improved thermal stability, and exhibits higher molecular weight and mechanical properties such as and improved strength and the like.

It is another object of the invention to provide a method for preparing the polyalkylene carbonate resin.

Technical Solution

The present invention provides polyalkylenecarbonate resin comprising a repeat unit of Chemical Formula 3-1 or Chemical Formula 3-2, a repeat unit of Chemical Formula 3-3 and a repeat unit of Chemical Formula 3-4:

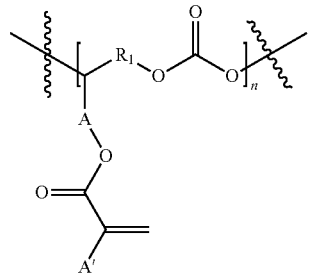

[Chemical Formula 3-1]

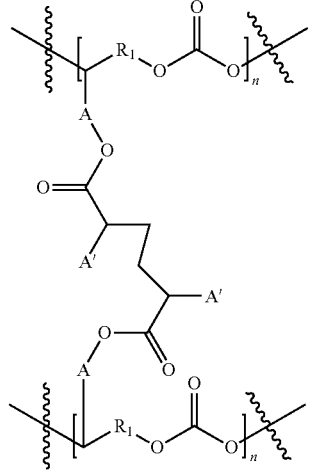

[Chemical Formula 3-2]

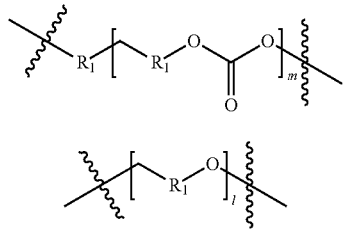

[Chemical Formula 3-3]

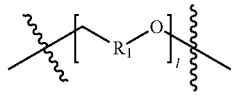

[Chemical Formula 3-4]

in the Chemical Formulae 3-1 to 3-4, R1 is a single bond or C1-4 alkylene, n is an integer of 2 to 250, m is an integer of 10 to 5000, l is an integer of 2 to 250, A is a single bond, a C1-9 alkylene group or a C6-20 arylene group, and A' is hydrogen or a methyl group.

In the polyalkylene carbonate resin, the repeat unit of the Chemical Formula 3-1 or 3-2 may be the polyalkylenecarbonate based repeat unit of the Chemical Formula 3-3 crosslinked by a compound of the following Chemical Formula 1:

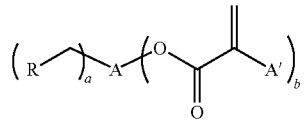

[Chemical Formula 1]

in the Chemical Formula 1, a and b are independently an integer equal to or greater than 1, R is a C1-5 alkylene oxide, A is a single bond, a C1-9 alkylene group or a C6-20 arylene group, and A' is hydrogen or a methyl group.

In addition, according to more specific embodiment, the repeat unit of the Chemical Formula 3-1 or Chemical Formula 3-2, the repeat unit of the Chemical Formula 3-3 and the repeat unit of the Chemical Formula 3-4 may respectively form a polymer block, the polymer blocks may be bonded each other in a random sequence by a single bond or a C1-3 alkylene group, and the polyalkylenecarbonate resin may have a hydroxyl group (—OH) at the end.

Also, the polyalkylenecarbonate resin may comprise 0.1 to 6 mol % of the repeat unit of the Chemical Formula 3-1 or Chemical Formula 3-2, 90 to 99 mol % of the repeat unit of the Chemical Formula 3-3, and 0.1 to 6 mol % of the repeat unit of the Chemical Formula 3-4.

In the Chemical Formula 1, it is appropriate that a and b are independently 1 to 6, and (a+b) is an integer of 2 to 6. Further, in the Chemical Formula 1, A may be a single bond.

In addition, the compound of the Chemical Formula 1 may appropriately comprise glycidyl methacrylate of the following Chemical Formula 2:

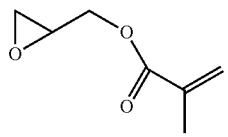

[Chemical Formula 2]

The polyalkylenecarbonate resin may have weight average molecular weight of 5,000 to 1,000,000.

Meanwhile, the present invention also provide a method for preparing the polyalkylenecarbonate resin of claim 1, comprising the step of copolymerizing an epoxide compound, a compound of the following Chemical Formula 1 with an acrylate structure having at least one epoxy group, and carbon dioxide in the presence of heterogeneous catalyst to prepare polymer.

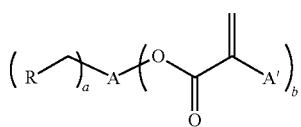

[Chemical Formula 1]

in the Chemical Formula 1, a and b are independently an integer equal to or greater than 1, R is C1-5 alkylene oxide, A is a single bond, a C1-9 alkylene group or a C6-20 arylene group, and A' is hydrogen or a methyl group.

Wherein, the compound of the Chemical Formula 1 may be used at a ratio of about 10 to 90 based on the molar equivalent of a catalyst.

In addition, the heterogeneous catalyst may include zinc dicarboxylate catalyst that is treated or not treated with acrylic acid such as monocarboxylic acid, for example, zinc glutarate (ZnGA). Wherein, the zinc glutarate (ZnGA) catalyst may be in the form of a heterogeneous catalyst prepared by the reaction of zinc oxide and glutaric acid.

Also, in the copolymerization step, solution polymerization may be progressed using at least one solvent selected from the group consisting of chlorine-containing hydrocarbon solvent such as methylene chloride or 1,2-dichloromethane and the like, and aromatic hydrocarbon solvent such as hexane or toluene.

And, after the copolymerization step, a step of thermally curing the polymer obtained by the copolymerization may be further comprised.

Furthermore, the copolymerization may be progressed at a temperature of 20° C. to 120° C., and in the thermal curing step, if necessary, widely known radical polymerization initiator, for example, AIBN and the like may be added to the resin to progress thermal curing.

In addition, the epoxide compound may be at least one selected from the group consisting of C2-20 alkylene oxide unsubstituted or substituted with halogen or a C1-5 alkyl group; C4-20 cycloalkyleneoxide unsubstituted or substituted with halogen or a C1-5 alkyl group; and C8-20 styrene oxide unsubstituted or substituted with halogen or a C1-5 alkyl group.

Advantageous Effects

The polyalkylenecarbonate resin of the present invention further comprises a polyalkylene carbonate based repeat unit partially crosslinked by a specific unsaturated compound, thereby inhibiting decomposition of a polymer chain by back biting and the like when thermally cured or heated, thus exhibiting more improved thermal stability.

Due to the improved thermal stability, the polyalkylenecarbonate resin may exhibit and maintain higher molecular weight, mechanical properties such as more improved strength and high crosslinking degree, and has advantages in terms of rheology. Thus, the polyalkylenecarbonate resin may be used for various applications.

MODE OF INVENTION

Hereinafter, the present invention will be explained in detail. The terms or words used herein should not be limited to dictionary definitions, and should be interpreted as meanings and concepts corresponding to the technical idea of the present invention, based on the principle that the inventor can appropriately define the concepts of terms in order to explain the invention in the best way.

According to one aspect of the invention, provided is polyalkylenecarbonate resin comprising a repeat unit of Chemical Formula 3-1 or Chemical Formula 3-2, a repeat unit of Chemical Formula 3-3 and a repeat unit of Chemical Formula 3-4:

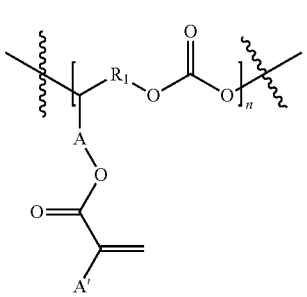

[Chemical Formula 3-1]

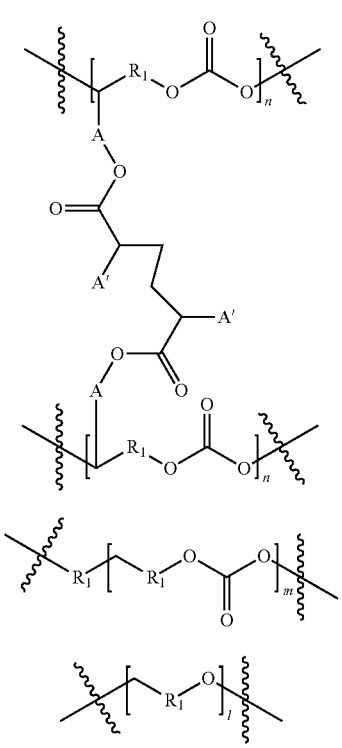

[Chemical Formula 3-2]

[Chemical Formula 3-3]

[Chemical Formula 3-4]

in the Chemical Formulae 3-1 to 3-4, R1 is a single bond or C1-4 alkylene, n is an integer of 2 to 250, m is an integer of 10 to 5000, l is an integer of 2 to 250, A is a single bond, a C1-9 alkylene group or a C6-20 arylene group, and A' is hydrogen or a methyl group.

As explained above, the polyalkylenecarbonate resin according to one embodiment further comprises a repeat unit of the Chemical Formula 3-1 or Chemical Formula 3-2 wherein a part of polyalkylenecarbonate based repeat units are crosslinked by a specific unsaturated compound, together with a polyalkylenecarbonate based repeat unit of the Chemical Formula 3-3 and a polyalkyleneglycol based repeat unit of the Chemical Formula 3-4, which were included in the previously known polyalkylenecarbonate resin. Wherein, the repeat unit of the Chemical Formula 3-2 may be a repeat unit with a crosslink structure obtained by additional reaction between the unsaturated bonds included in the repeat unit of the Chemical Formula 3-1.

By comprising such crosslink structure and specific repeat units, decomposition of a polymer chain by back biting and the like may be inhibited when polyalkylene carbonate resin is thermally cured or exposed to heat during the use, and thus, exhibit more improved thermal stability. For reference, such improved thermal stability may be confirmed from the point that generation degree of cyclic carbonate (for example, ethylene carbonate in the examples below) is relatively low, after heating or thermally curing the polyalkylenecarbonate resin above a predetermined time, as described in the examples below.

As the result, the polyalkylenecarbonate resin may exhibit and maintain higher molecular weight, mechanical properties such as more improved strength and the like, and high crosslinking degree, and has advantages in terms of rheology. Thus, the polyalkylenecarbonate resin may be used for various applications.

Meanwhile, in the polyalkylenecarbonate resin, the repeat unit of the Chemical Formula 3-1 or 3-2 may be the polyalkylenecarbonate based repeat unit of the Chemical Formula 3-3 crosslinked by a compound of the following Chemical Formula 1:

[Chemical Formula 1]

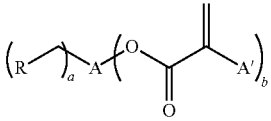

in the Chemical Formula 1, a and b are independently an integer equal to or greater than 1, R is a C1-5 alkylene oxide, A is a single bond, a C1-9 alkylene group or a C6-20 arylene group, and A' is hydrogen or a methyl group.

And, according to more specific embodiments, the repeat unit of the Chemical Formula 3-1 or Chemical Formula 3-2, the repeat unit of the Chemical Formula 3-3 and the repeat unit of the Chemical Formula 3-4 may respectively form polymer blocks, the polymer blocks may be bonded each other in a random sequence by a single bond or a C1-3 alkylene group, and the polyalkylenecarbonate resin may have a structure wherein hydroxyl group(—OH) derived from the polyalkylenecarbonate based repeat unit and/or polyalkyleneglycol based repeat unit is bonded at the end.

According to most preferable embodiment, the polyalkylenecarbonate resin may have a structure of the following Chemical Formula 3 or 4, wherein the bonding sequence of each repeat unit constituting each polymer block may be random as explained above. In addition, according to appropriate embodiment, A' may be a methyl group. Thereby, the polyalkylenecarbonate resin may exhibit more improved thermal stability and the resulting excellent mechanical properties, high molecular weight and crosslinking degree, and satisfactory rheological property.

[Chemical Formula 3]

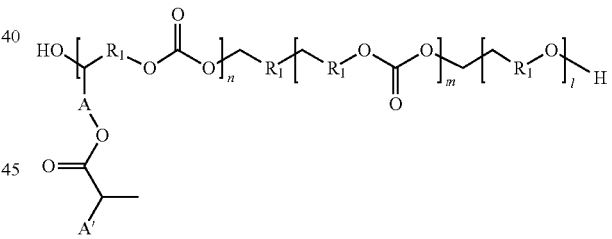

[Chemical Formula 4]

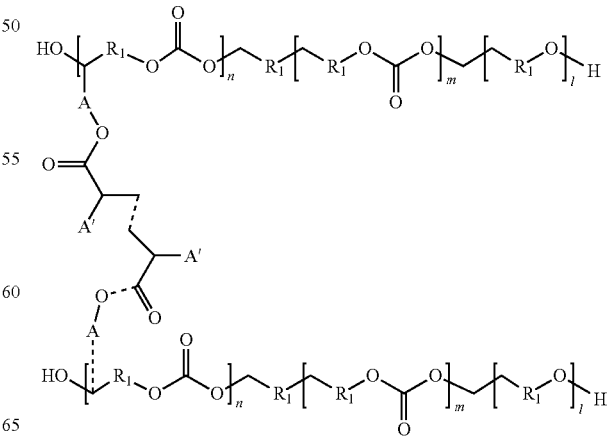

In the Chemical Formulae 3 and 4, A, A', R1, l, m, and n are as defined in the Chemical Formulae 3-1 to 3-4.

In addition, the polyalkylenecarbonate resin may comprise an appropriate content of the crosslinked repeat unit of the Chemical Formula 3-1 or Chemical Formula 3-2, considering required thermal stability, molecular weight and mechanical properties and the like. For example, the polyalkylenecarbonate resin may comprise about 0.1 to 6 mol % or about 0.1 to 4 mol % of the repeat unit of the Chemical Formula 3-1 or Chemical Formula 3-2, about 90 to 99 mol % or about 93 to 99 mol % of the repeat unit of the Chemical Formula 3-3, and about 0.1 to 6 mol % or about 0.5 to 3 mol % of the repeat unit of the Chemical Formula 3-4.

However, if the content of the repeat unit of the Chemical Formula 3-1 or Chemical Formula 3-2 becomes too low, the crosslink structure introduced in the resin and the resulting crosslinking degree of the resin may be too small, and thus, it may be difficult to exhibit excellent thermal stability, and if the content is too high, unique characteristics of the polyalkylenecarbonate resin, for example, biodegradability and the like may not be properly exhibited.

Further, in the unsaturated compound of the Chemical Formula 1 for forming the repeat unit with a crosslink structure of the Chemical Formula 3-1 or 3-2, it may be appropriate that a and b are independently 1 to 6, and (a+b) is an integer of 2 to 6. According to specific embodiment, a and b may be independently 1, and in the Chemical Formula 1, A may be a single bond.

In addition, it may be more appropriate that the compound of the Chemical Formula 1 is glycidyl methacrylate of the following Chemical Formula 2, or glycidyl acrylate and the like.

[Chemical Formula 2]

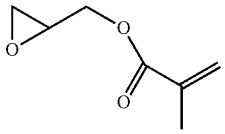

Thereby, the polyalkylenecarbonate resin may exhibit appropriate crosslinking degree, molecular weight and mechanical properties and the like, and maintain unique characteristics of biodegradable resin.

The polyalkylenecarbonate resin may have a weight average molecular weight of about 5,000 to 1,000,000, or about 10,000 to 500,000.

Meanwhile, according to another aspect, provided is a method for preparing the polyalkylenecarbonate resin according to one aspect. The preparation method may comprise the step of copolymerizing an epoxide compound, a compound of the following Chemical Formula 1 with an acrylate structure having at least one epoxy group, and carbon dioxide in the presence of heterogeneous catalyst to prepare polymer.

[Chemical Formula 1]

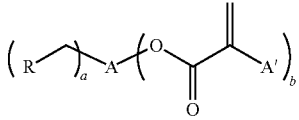

in the Chemical Formula 1, a and b are independently an integer equal to or greater than 1, R is C1-5 alkylene oxide, A is a single bond, a C1-9 alkylene group or a C6-20 arylene group, and A' is hydrogen or a methyl group.

As explained above, the previously known polyalkylenecarbonate resin has a linear structure, and when exposed to heat, the polymer main chain may be decomposed by back biting and the like, and thus, there were limitations in improvement in molecular weight and mechanical properties, and there was a difficulty in long term storage due to the characteristics of biodegradable resin.

However, if a compound of the Chemical Formula 1 is additionally used to introduce a crosslink structure in the process of preparing polyalkylenecarbonate resin by copolymerization of an epoxide compound and carbon dioxide, the polyalkylenecarbonate resin according to one aspect may be prepared. The polyalkylenecarbonate resin, as explained above, may exhibit excellent thermal stability due to the introduction of the crosslink structure and improvement in crosslinking degree, and thus, exhibit superior mechanical properties, high molecular weight and excellent rheological properties.

Hereinafter, the preparation method according to another aspect may be explained in detail.

The heterogeneous catalyst used in the preparation method may be representatively a zinc based catalyst, and for example, it may include zinc dicarboxylate catalyst that is treated or not treated with monocarboxylic acid, for example, zinc glutarate (ZnGA) catalyst. Wherein, the zinc glutarate (ZnGA) catalyst may be a heterogeneous catalyst prepared by the reaction of zinc oxide and glutaric acid. In the reaction for preparation of the heterogeneous catalyst, a boiling aromatic solvent, for example, boiling toluene or benzene and the like may be used.

In the preparation method, the highly reactive epoxide compound (for example, ethylene oxide (EO)) is activated by the heterogeneous catalyst together with the compound of the Chemical Formula 1, and reacts with carbon dioxide and thus is copolymerized and prepared into polyalkylenecarbonate resin with high molecular weight and improved thermal stability according to one aspect, through alternating copolymerization.

And, after the copolymerization step, the step of thermally curing the polymer obtained by the copolymerization may be further comprised, and by the thermal curing, thermal stability and mechanical properties of the polyalkylenecarbonate resin may be further improved.

Meanwhile, in the preparation method, the compound of the Chemical Formula 1 may be used at a ratio of about 10 to 90 based on the molar equivalent of the catalyst. If the content of the compound of the Chemical Formula 1 is too small based on the molar equivalent of the catalyst, the crosslink structure introduced in the resin may be too small and thus it may be difficult to exhibit excellent thermal stability, and if the content is too large, unique characteristic of polyalkylenecarbonate resin, for example, biodegradability and the like may not be properly exhibited.

In addition, in the copolymerization step, solution polymerization may be progressed using at least one solvent selected from the group consisting of chlorine-containing hydrocarbon based solvent such as methylene chloride or 1,2-dichloromethane and the like, or aromatic hydrocarbon based solvent such as hexane or toluene and the like. Wherein, it is appropriate that the solvent is used in a relatively small amount compared to each monomers and reactants, and for example, the solvent may be used in an amount capable of uniformly dissolving and dispersing monomers and reactants.

Furthermore, in the copolymerization step, the catalyst may be introduced at a mole ratio of catalyst:epoxide compound of 1:50 to 1:1000.

Meanwhile, in the preparation method of polyalkylenecarbonate resin, the epoxide compound used as main monomers may be selected from the group consisting of C2-20 alkylene oxide unsubstituted or substituted with halogen or a C1-5 alkyl group; C4-20 cycloalkyleneoxide unsubstituted or substituted with halogen or a C1-5 alkyl group; and C8-20 styrene oxide unsubstituted or substituted with halogen or a C1-5 alkyl group. It is preferable that the epoxide compound includes C2-20 alkylene oxide unsubstituted or substituted with halogen or a C1-5 alkyl group.

In addition, specific examples of the epxoide compound may include ethylene oxide, propylene oxide, butene oxide, pentene oxide, hexene oxide, octene oxide, decene oxide, dodecene oxide, tetradecene oxide, hexadecene oxide, octadecene oxide, monooxide, 1,2-epoxy-7-octene, epifluorohydrin, epichlorohydrin, epibromohydrin, isopropyl glycidyl ether, butyl glycidyl ether, t-butyl glycidyl ether. 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxy propylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxy propylether, epoxy propyl methoxyphenyl ether, biphenyl glycidyl ether, glycidyl naphthyl ether, and the like. Preferably, ethylene oxide may be used as the epoxide compound.

And, the method for preparing polyalkylenecarbonate resin may be progressed by alternating copolymerization, for example, batch type polymerization, semi-batch type polymerization, or continuous polymerization and the like. In case, batch type or semi-batch type polymerization is used, reaction time may be about 1 to 24 hours, or about 1.5 to 6 hours, and in case continuous polymerization is used, average residence time of the catalyst may be about 1 to 24 hours, similarly.

In addition, in the polymerization of polyalkylenecarbonate resin, carbon dioxide pressure may be about atmospheric pressure to 100 atm, for example, about 2 to 50 atm. And, the carbon dioxide may be introduced at a mole ratio of about 1:1 to 10:1 based on the epoxide compound.

The copolymerization may be conducted at a temperature of about 20° C. to 120° C., or about 50° C. to 90° C., and during the thermal curing, if necessary, commonly known radical polymerization initiator, for example, AIBN and the like may be further added to the resin to progress thermal curing. According to specific embodiment, the copolymerization may be solution polymerization conducted at about 50 to 100° C. and about 10 to 50 bar, for about 1 to 60 hours. And, the solution polymerization may be conducted at about 70 to 90° C. and about 20 to 40 bar, for about 3 to 40 hours, or about 3 to 9 hours.

The thermal curing selectively progressed after the copolymerization may be conducted at about 50 to 200° C., but is not limited thereto.

In the preparation method of polyalkylenecarbonate resin, in the copolymerization step, if necessary, a chain transfer agent may be added. The chain transfer agent may be used at a mole ratio of about 1:1 to 10 based on the molar equivalent of the catalyst.

Hereinafter, preferable examples of the invention will be explained in detail. However, these examples are only to illustrate the invention, and the scope of the invention is not limited thereto.

EXAMPLES 1 to 4

Copolymerization of Carbon Dioxide/Ethylene Oxide in the Presence of GMA (Glycidyl Methacrylate)

To a 30 mL bomb reactor, zinc glutaric acid (ZnGA) catalyst was added at a mole ratio of monomers (ethylene oxide)/catalyst=500/1~100/1, and 10 g of ethylene oxide was quantified and introduced. GMA was introduced in the content of 1 mol % or 5 mol % based on the content of the ethylene oxide, as described in Table 1, and simultaneously, 4-methoxyphenol inhibitor was introduced in the content of about 25 mol % based on the introduced amount of GMA, and the reactor was assembled.

Thereafter, 30 bar carbon dioxide gas pressure was applied, and then, the reactor was immersed in an oil bath of which temperature was previously controlled to 70° C., and agitation began. After 50 minutes, internal temperature of the reactor reached 70° C., and from this point, it was observed that reactor pressure decreased. As described in the following Table 2, for 3 hours or 5 hours after the time when the internal temperature of the reactor reached 70° C. and reaction began, polymerization reaction was conducted. The reactor was immersed in a cold bath and cooled, and then, carbon dioxide gas was removed to complete the reaction. After the reaction was completed, a light yellow sticky solution was obtained. To the prepared sticky solution, 20 g of methylene chloride was additionally added to decrease the viscosity of the solution, and the solution was precipitated in cold methanol to obtain polymer. Subsequently, monomers were removed by vacuum suction. Through these processes, polyalkylene carbonate resins of Examples 1 to 4 were obtained. It was confirmed through NMR analysis results described below that the polyalkylene carbonate resins comprise a repeat unit of the Chemical Formula 3-1, a repeat unit of the Chemical Formula 3-3 and a repeat unit of the Chemical Formula 3-4.

Examples 1-1 to 4-1

Progression of Additional Thermal Curing

The polyalkylene carbonate resins obtained in Examples 1 to 4 were thermally cured (oven heated) at a temperature equal to or greater than 100° C. for 3 hours to respectively obtain polyalkylene carbonate resins of Examples 1-1 to 4-1. It was also confirmed through NMR analysis results described below that the polyalkylene carbonate resins comprise a repeat unit of the Chemical Formula 3-1, a repeat unit of the Chemical Formula 3-3 and a repeat unit of the Chemical Formula 3-4.

Comparative Examples 1 and 2

Polyalkylene carbonate resin of Comparative Example 1 was prepared under the same conditions as Examples 1 to 4, except that polymerization time was 3 hours and GMA was not used.

In addition, the obtained polyalkylene carbonate resin of Comparative Example 1 was simply mixed with 1 mol % of GMA based on the content of ethylene oxide used for polymerization, to obtain a polyalkylene carbonate resin composition of Comparative Example 2.

Comparative Examples 1-1 to 2-1

Progression of Additional Thermal Curing

The polyalkylene carbonate resin obtained in Comparative Examples 1 (or the composition of Comparative Examples 2) was thermally cured (oven heated) at a temperature equal to or greater than 100° C. for 3 hours to respectively obtain polyalkylene carbonate resin (or composition) of Comparative Examples 1-1 and 2-1.

Experimental Example

NMR Analysis of Polyalkylene Carbonate Resin

According to the following analysis method, the polyalkylene carbonate resins (or composition) of Examples and Comparative Examples were analyzed by NMR, to analyze the content of each repeat unit included in the resin (or composition), and the content of by-products (representatively, ethylene carbonate) and remaining GMA. Wherein, the delta shift ranges of the NMR analysis result where the existences and contents of each repeat unit, by-products and remaining GMA were confirmed are summarized in the following Table 1.

1. Analysis Method

1H-NMR was measured in $CDCl_3$ medium on the basis of TMS peak. In addition, a sample with very high molecular weight may not be dissolved at low temperature. The existence and content of the repeat unit of the Chemical Formula 3-1 was analyzed by confirming unsaturated bond derived from GMA remaining in the repeat unit of the Chemical Formula 3-1 through NMR analysis. For reference, since the unsaturated bond may be maintained due to the existence of inhibitor, the existence and content of the Chemical Formula 3-1 can be confirmed by confirmation and analysis of the unsaturated bond.

TABLE 1

|  | Chemical Formula 3-3 |  | Chemical Formula 3-4 | Chemical Formula 3-1 | By-products | Remaining substance |
|---|---|---|---|---|---|---|
| Structure | PEC | PEC-PEG | PEG | PGMA | EC | GMA |
| Delta shift | 4.38 | 4.28-4.31, 3.71-3.74 | 3.65-3.72 | 5.2 | 4.50 | 5.62 |

Together with the analysis results of the Experimental Example, brief polymerization conditions of Examples are summarized in the following Table 2.

TABLE 2

|  | GMA used amount (mol %) | Thermal curing time | Polymerization time | Chemical Formula 3-3 (mol %) | Chemical Formula 3-4 (mol %) | Chemical Formula 3-1 (mol %) | By-products (EC, mol %) | Remaining GMA (mol %) |
|---|---|---|---|---|---|---|---|---|
| Example 1 | 1 | 0 h | 5 h | 98.78 | 0.68 | 0.15 | 0.38 | 0.01 |
| Example 2 | 5 | 0 h | 5 h | 93.89 | 1.07 | 3.46 | 0.46 | 1.12 |
| Example 3 | 1 | 0 h | 3 h | 98.36 | 0.97 | 0.23 | 0.36 | 0.08 |
| Example 4 | 5 | 0 h | 3 h | 97.54 | 1.01 | 1.01 | 0.37 | 0.07 |
| Example 1-1 | 1 | 3 h | 5 h | 97.07 | 1.66 | 0.19 | 0.63 | 0.45 |
| Example 2-1 | 5 | 3 h | 5 h | 93.48 | 1.66 | 3.15 | 1.67 | 0.04 |
| Example 3-1 | 1 | 3 h | 3 h | 97.5 | 1.43 | 0.23 | 0.76 | 0.08 |
| Example 4-1 | 5 | 3 h | 3 h | 96.19 | 1.27 | 1.52 | 0.55 | 0.47 |
| Comparative Example 1 | 0 | 0 h | 3 h | 98.06 | 1.22 | N/A | 0.72 | N/A |
| Comparative Example 2 | 1 | 0 h | PEC + GMA | 97.36 | 0.59 | 0.00 | 1.10 | 0.95 |
| Comparative Example 1-1 | 0 | 0 h | 3 h | 95.47 | 1.73 | N/A | 2.80 | N/A |
| Comparative Example 2-1 | 1 | 3 h | PEC + GMA | 97.36 | 0.59 | 0.00 | 1.98 | 0.07 |

Referring to the Table 2, it was confirmed that when the polyalkylene carbonate resins of Examples 1 to 4 and 1-1 to 4-1 are exposed to heat (thermally cured), decomposition decreased, and thus by-products (EC) increase was slight. It was also confirmed that relatively low content of by-products are included in the prepared resin, supporting excellent thermal stability of Examples.

To the contrary, it was confirmed that the polyalkylene carbonate resins of Comparative Examples include relatively high contents of by-products, and decomposition and by-products increase after thermal curing are significant, and thus, thermal stability is relatively inadequate.

Although the specific parts of the invention have been described in detail, it may be obvious to one of ordinary knowledge in the art that such specific technologies are preferable embodiment, and the scope of the invention is not limited thereto. Thus, the substantial scope of the invention is determined by claims attached hereto and equivalents thereof.

The invention claimed is:

1. A polyalkylenecarbonate resin produced by solution copolymerization, the polycarbonate resin comprising 0.1 to 6 mol % of a repeat unit of Chemical Formula 3a or Chemical Formula 3b; 90 to 99 mol % of a repeat unit of Chemical Formula 3c; and 0.1 to 6 mol % of a repeat unit of Chemical Formula 3d, wherein the repeat unit of Chemical Formula 3a or Chemical Formula 3b, the repeat unit of Chemical Formula 3c and the repeat unit of Chemical Formula 3d, respectively, form polymer blocks, the polymer blocks being bonded to each other in a random sequence by a single bond or a C1-3 alkylene group:

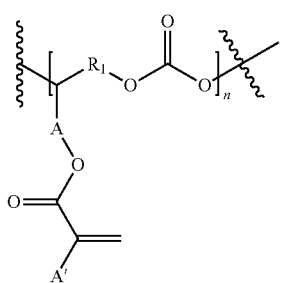

[Chemical Formula 3a]

-continued

[Chemical Formula 3b]

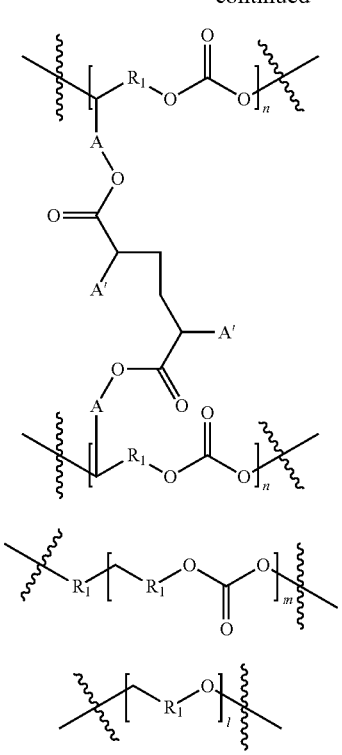

[Chemical Formula 3c]

[Chemical Formula 3d]

wherein in the Chemical Formulae 3a to 3d, R1 is a single bond or C1-4 alkylene, n is an integer of 2 to 250, m is an integer of 10 to 5000, l is an integer of 2 to 250, A is a single bond, a C1-9 alkylene group or a C6-20 arylene group, and A' is hydrogen or a methyl group.

2. The polyalkylene resin according to claim 1, wherein the repeat unit of the Chemical Formula 3a or 3b is a polyalkylenecarbonate based repeat unit of the Chemical Formula 3c crosslinked by a compound of the following Chemical Formula 1:

[Chemical Formula 1]

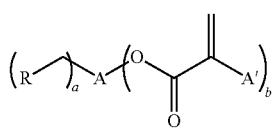

wherein in the Chemical Formula 1, a and b are independently an integer equal to or greater than 1, R is C2-5 alkylene oxide, A is a single bond, a C1-9 alkylene group or a C6-20 arylene group, and A' is hydrogen or a methyl group.

3. The polyalkylenecarbonate resin according to claim 1, wherein the polyalkylenecarbonate resin has a hydroxyl group(—OH) at the end.

4. The polyalkylenecarbonate resin according to claim 1, comprising 0.1 to 4 mol % of the repeat unit of the Chemical Formula 3a or Chemical Formula 3b, 93 to 99 mol % of the repeat unit of the Chemical Formula 3c, and 3 to 5 mol % of the repeat unit of the Chemical Formula 3d.

5. The polyalkylenecarbonate resin according to claim 2, wherein in the Chemical Formula 1, a and b are independently 1 to 6.

6. The polyalkylenecarbonate resin according to claim 2, wherein in the Chemical Formula 1, (a+b) is an integer of 2 to 6.

7. The polyalkylenecarbonate resin according to claim 1, wherein A is a single bond.

8. The polyalkylenecarbonate resin according to claim 1, wherein the polyalkylenecarbonate resin has weight average molecular weight of 5,000 to 1,000,000.

9. A method for preparing the polyalkylenecarbonate resin of claim 1, comprising the step of solution copolymerizing an epoxide compound, a compound of the following Chemical Formula 1 with an acrylate structure having at least one epoxy group, and carbon dioxide in the presence of heterogeneous catalyst to prepare polymer;

[Chemical Formula 1]

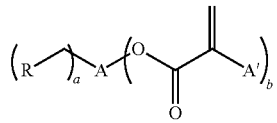

in the Chemical Formula 1, a and b are independently an integer equal to or greater than 1, R is C1-5 alkylene oxide, A is a single bond, a C1-9 alkylene group or a C6-20 arylene group, and A' is hydrogen or a methyl group.

10. The method according to claim 9, wherein the compound of the Chemical Formula 1 includes glycidyl methacrylate of the following Chemical Formula 2

[Chemical Formula 2]

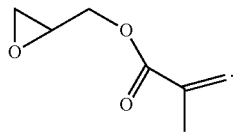

11. The method according to claim 9, wherein the compound of the Chemical Formula 1 is used at a ratio of 10 to 90 based on the molar equivalent of the catalyst.

12. The method according to claim 9, wherein the heterogeneous catalyst includes zinc dicarboxylate catalyst that is treated or not treated with monocarboxylic acid.

13. The method according to claim 12, wherein the zinc dicarboxylate catalyst is zinc glutarate (ZnGA) catalyst.

14. The method according to claim 9, wherein in the solution copolymerization step, at least one solvent selected from the group consisting of chlorine-containing hydrocarbon solvent and aromatic hydrocarbon solvent is used.

15. The method according to claim 9, wherein after the copolymerization step, the method further comprises the step of thermally curing the polymer produced by the solution copolymerization.

16. The method according to claim 9, wherein the copolymerization step is progressed at a temperature of 20° C. to 120° C.

17. The method according to claim 9, wherein the epoxide compound is at least one selected from the group consisting of C2-20 alkylene oxide unsubstituted or substituted with halogen or a C1-5 alkyl group; C4-20 cycloalkyleneoxide unsubstituted or substituted with halogen or a C1-5 alkyl group; and C8-20 styrene oxide unsubstituted or substituted with halogen or a C1-5 alkyl group.

* * * * *